(12) United States Patent
Gerakoulis et al.

(10) Patent No.: US 7,650,150 B1
(45) Date of Patent: Jan. 19, 2010

(54) POINT COORDINATED SPREAD-SPECTRUM WIRELESS LOCAL AREA NETWORK

(76) Inventors: Diakoumis Parissis Gerakoulis, 135 Oak St., Dover, NJ (US) 07801; Kenny Xiaojian Huang, 135 Skipton Pl., Somerset, NJ (US) 08873; Robert Raymond Miller, II, 12 Bradley Rd., Convent Station, NJ (US) 07960; Matthew J. Sherman, 4 Atlantis Dr., Succasunna, NJ (US) 07876

( * ) Notice: Subject to any disclaimer, the term of this patent is extended or adjusted under 35 U.S.C. 154(b) by 385 days.

(21) Appl. No.: 11/235,927

(22) Filed: Sep. 27, 2005

Related U.S. Application Data (63) Continuation of application No. 10/435,875, filed on May 12, 2003, now Pat. No. 6,980,810.

(51) Int. Cl.
*H04Q 7/20* (2006.01)
*H04J 3/06* (2006.01)

(52) U.S. Cl. .................... 455/450; 370/350; 455/446

(58) Field of Classification Search .............. 455/450, 455/433, 446; 370/321, 338, 350, 337, 328, 370/329
See application file for complete search history.

(56) References Cited

U.S. PATENT DOCUMENTS

| | | | |
|---|---|---|---|
| 7,031,274 B2* | 4/2006 | Sherman | 370/321 |
| 7,280,517 B2* | 10/2007 | Benveniste | 370/338 |
| 2002/0173272 A1* | 11/2002 | Liang et al. | 455/63 |
| 2002/0188723 A1* | 12/2002 | Choi et al. | 709/225 |
| 2003/0123414 A1* | 7/2003 | Tong et al. | 370/337 |
| 2003/0129984 A1* | 7/2003 | Dent | 455/446 |
| 2003/0174690 A1* | 9/2003 | Benveniste | 370/350 |

* cited by examiner

*Primary Examiner*—Charles N Appiah
*Assistant Examiner*—Kiet Doan (57) ABSTRACT

Methods, devices and systems for WLAN communication are described. Intercell interference between overlapping WLAN cells is mitigated by a combination of frequency reuse, code division and time resource negotiation. Information used for time resource negotiation can be broadcast via beacon signal or communicated via a wireline backbone system which interconnects access points.

1 Claim, 6 Drawing Sheets

POINT COORDINATED SPREAD-SPECTRUM WIRELESS LOCAL AREA NETWORK

RELATED APPLICATIONS

This application is a Continuation of application Ser. No. 10/435,875, filed May 12, 2003 now U.S. Pat. No. 6,980,810.

BACKGROUND

The present invention relates generally to wireless communication systems and, more particularly, to spread spectrum wireless communication systems adapted for use in local area networks (LANs).

Technologies associated with the communication of information have evolved rapidly over the last several decades. For example, over the last two decades wireless communication technologies have transitioned from providing products that were originally viewed as novelty items to providing products which are the fundamental means for mobile communications. Perhaps the most influential of these wireless technologies were cellular telephone systems and products. Cellular technologies emerged to provide a mobile extension to existing wireline communication systems, providing users with ubiquitous coverage using traditional circuit-switched radio paths. Cellular users were able to travel from area to area without losing their wireless connection by handing off their connection from one cellular base station to another. As the demand for cellular products and services grew, the ability of system operators and designers to provide wireless connections to greater numbers of users in a given geographic area became increasingly challenging. This led to the allocation of more frequencies for use in cellular systems by government regulators, as well as to the development of techniques that more efficiently use the allocated bandwidth. One such technique is known as "frequency reuse" which describes an allocation of frequency sets (channels) to cells based on a predetermined pattern. The pattern is designed to provide for a minimum frequency reuse distance, i.e., to separate cells employing the same frequencies by a minimum distance which is determined to meet system specifications for same channel interference.

Wireless local area networks (WLANs), on the other hand, followed a much different evolutionary path than cellular systems. Initial WLAN implementations tended to have architectures designed to provide peer groups with the ability to exchange information on an ad hoc basis, e.g., to connect a personal computer in an office with a printer and a laptop. These small workgroups, in isolated areas, didn't require many of the advanced techniques designed for cellular systems because (a) the small WLAN workgroups generally didn't overlap in their coverage areas and (b) the equipment wasn't nearly as mobile as were cell phones. Additionally, the types of data transfer applications for which WLANs were used, e.g., sending a job to a printer, were relatively delay insensitive. Thus, if interference caused a data transmission error over a WLAN connection, the data could simply be retransmitted with little or no perceived quality degradation. As a result, cellular techniques such as frequency reuse are not employed in today's WLAN systems because intercell interference has not traditionally been considered to be a significant problem in this environment.

Uses of WLANs are, however, undergoing a rapid change. Today's workplace is a more fluid environment with people moving around the workplace and WLAN devices moving more frequently from one place to another. WLAN device groups are being clustered more closely together in densely populated office buildings. Moreover, the advent of the Internet, as well as the addition of video, audio and telephony to more mundane data streams, has increased the sensitivity of WLAN applications to delays introduced by errors and retransmissions. In many cases, the retransmission delay of data packets associated with, e.g., a video clip embedded in a spreadsheet application, can result in annoying gaps in the presentation which are equivalent to the data packets not being transmitted in the first place.

One approach to combat the rise of inter-cell interference related problems in WLAN implementations would be to implement frequency reuse therein. Most of today's WLAN systems operate in accordance with the IEEE 802.11b standard. As will be appreciated by those skilled in the art, IEEE 802.11 specifies that WLAN devices will use one of two spread spectrum access methodologies, specifically either frequency-hopping or code spreading. In frequency hopping systems, a wireless connection between two WLAN units will periodically change frequencies according to a predefined hop sequence. In code spreading (also sometimes referred to as "direct sequence spreading"), the wireless data signal is spread across a relatively wideband channel by, for example, multiplication with a pseudorandom noise (PN) sequence. Another example of a Physical Layer (PHY) code application is the transmission of a particular Orthogonal Frequency Division Multiplexing (OFDM) carrier pattern, as might be conducted using the 802.11a standard.

In either of the last two examples of WLAN systems, each channel requires a relatively wide frequency bandwidth. This limits the number of channels that are available in any given WLAN band. For example, in the 2400 MHz ISM band specified for WLAN usage in the United States, only eleven channels are available for simultaneous use to support different WLAN connections. The numbering system stems from frequency-hopping designations. Of these eleven channels, only three (numbers 1, 7 and 11) do not overlap in frequency when used with broader spread-spectrum (802.11b) spectral occupancies. Thus, the best possible frequency reuse pattern would only involve three different cells, resulting in a reuse distance that Applicants believe will not provide a sufficient protection against interference to enable the quality of service which will be demanded in future WLAN generations. Other modern WLAN-like services, such as the 5 GHz U-NII band with larger spectrum allocations, achieve higher-reuse factors but also tend to display increased susceptibility to interference due to the higher transmission rates used.

Accordingly, it would be desirable to provide techniques in addition to, or as an alternative to, frequency reuse which will reduce interference between closely spaced WLAN implementations.

SUMMARY

Systems and methods according to the present invention address this need and others by providing communication systems that combine frequency reuse, code division and negotiated time resource allocation to mitigate inter-cell interference. According to one exemplary method, this can include the steps of assigning a communication channel to a wireless station, the communication channel having a frequency and a code associated therewith; determining whether the wireless station is located in a first area which overlaps with another cell or in a second area which is non-overlapping with respect to that cell; and transmitting information to the wireless station during a first portion ("overlapping transmission period") of a superframe if the wireless station is located in the first area and, alternatively, during a second portion ("non-overlapping transmission period") of the superframe if the wireless station is located in the second area.

The information used to determine the duration of overlapping transmission periods and non-overlapping transmission periods can be communicated to the various system nodes using, for example, a beacon or other frame which is transmitted one or more times per superframe. Thus, according to another exemplary embodiment of the present invention, a method for communicating overlap management information can include the steps of transmitting, from a first cell, a first beacon signal indicating a first time period during which the first cell will transmit to wireless stations in an area which is overlapping with a second cell; transmitting, from the second cell, a second beacon signal indicating a second time period during which the second cell will transmit to wireless stations in an area which is overlapping with one of the first cell and the third cell; and transmitting, from the third cell, a third beacon signal indicating a third time period during which the third cell will transmit to wireless stations in an area which is overlapping with said second cell.

The information used to determine the overlapping or non-overlapping status can be based upon the amount of interference offered by a cell to others. This, in turn, may be determined by a variety of methods, for example that described in U.S. Patent Application Publication No. US2003/0012166 to Benveniste, the disclosure of which is incorporated here by reference. Information derived from such measurements together with traffic loading of individual cells can be used to determine appropriate time period allocations to minimize interference and maximize the amount of traffic borne by the multi-cell network of access point.

BRIEF DESCRIPTION OF THE DRAWINGS

The accompanying drawings illustrate exemplary embodiments of the present invention, wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Figure 1:
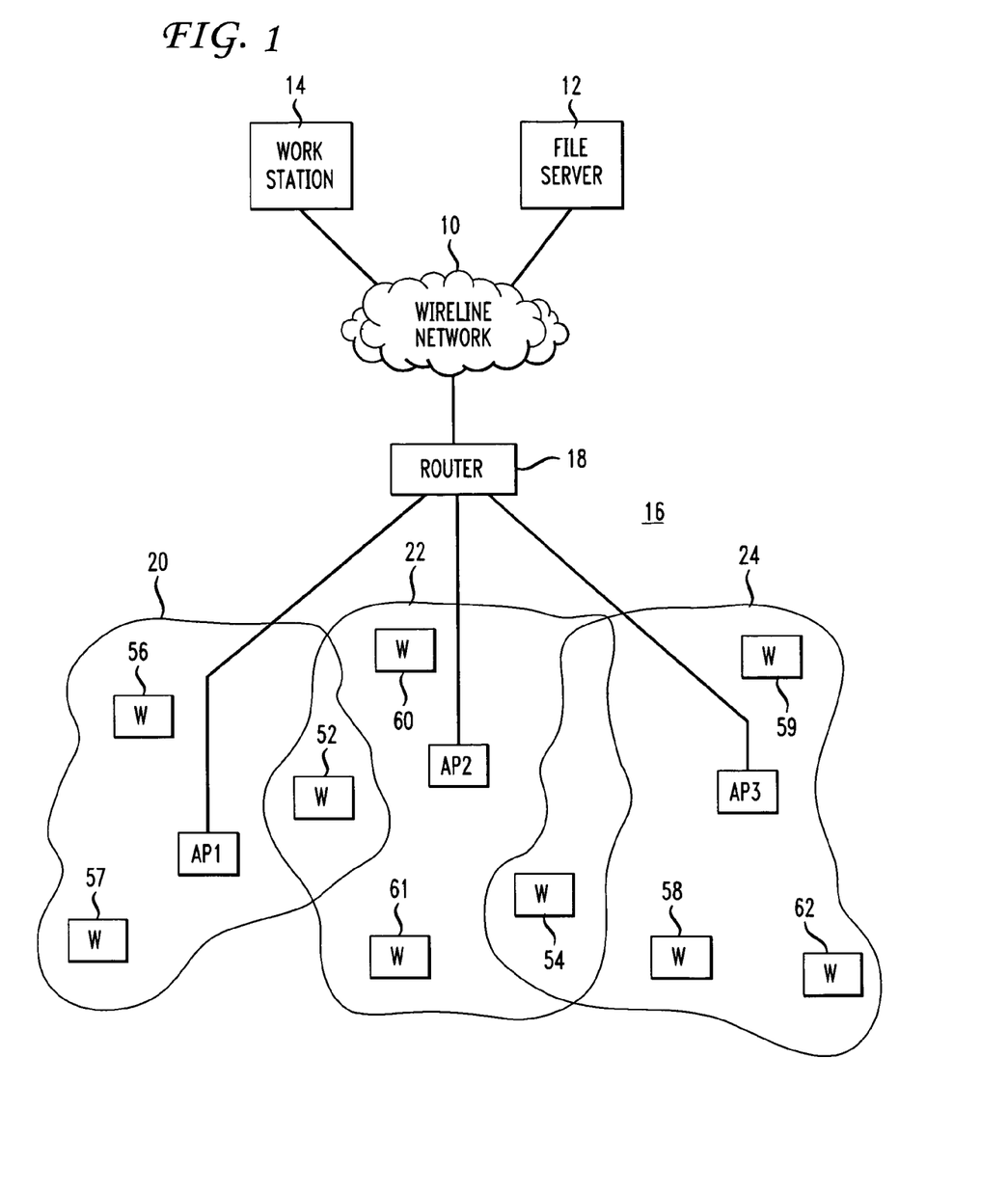
FIG. 1 depicts a WLAN system having overlapping cells in which the present invention can be implemented.

Devices and methods according to exemplary embodiments of the present invention provide techniques for reducing interference between overlapping cells in WLAN systems. Note that although the Background section refers to the 2.4 GHz band, those skilled in the art will appreciate that the present invention is also applicable to other frequency bands. In order to provide some context for this discussion, an exemplary WLAN system will first be described with respect to FIG. 1. Therein, a wireline network 10 (e.g., an Ethernet network) has a file server 12 and workstation 14 connected thereto. Those skilled in the art will appreciate that typical wireline networks will serve numerous fixed workstations 14; however only one is depicted in FIG. 1 for simplicity. The wireline network 10 is also connected to a WLAN 16 via router 18. The router 18 interconnects the access points (AP) of the WLAN 16 with the wireline network, through which the access points can, for example, communicate with the file server 12. In the exemplary WLAN system of FIG. 1, three cells 20, 22 and 24 (also sometimes referred to as a Basic Service Set (BSS) or Basic Service Area (BSA)) are shown, each with a respective AP, although those skilled in the art will once again appreciate that more or fewer cells may be provided in WLAN 16. Of particular interest in the context of the present invention is that cell pairs 20, 22 and 22, 24 have overlapping regions of wireless coverage. Within each cell, a respective AP serves a number of wireless stations (W) via a wireless connection.

As mentioned above, one drawback associated with conventional WLAN systems is their inability to handle interference associated with overlapping cells. Unlike some cellular systems, WLAN systems cannot deal with inter-cell interference by simply increasing the frequency reuse distance between cells. Accordingly, the present invention uses two features in addition to frequency reuse to improve WLAN system robustness with respect to inter-cell interference.

Figure 2:
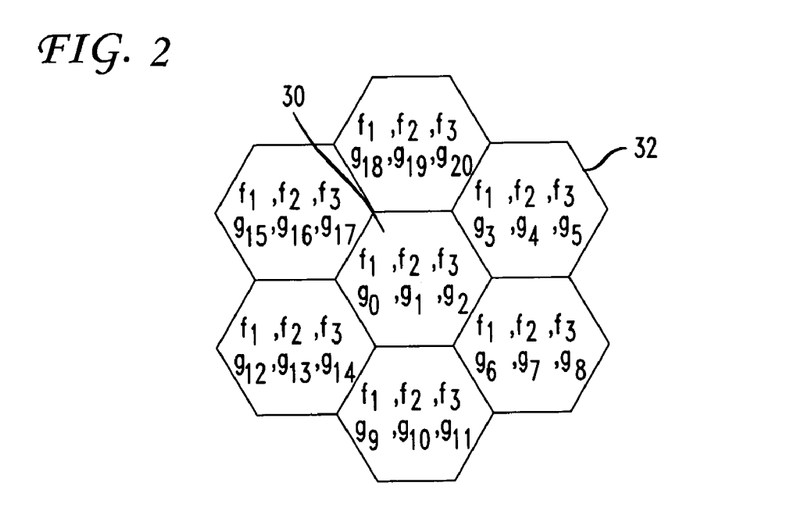
FIG. 2 depicts a frequency and code reuse pattern according to one exemplary embodiment of the present invention.
Figure 3:
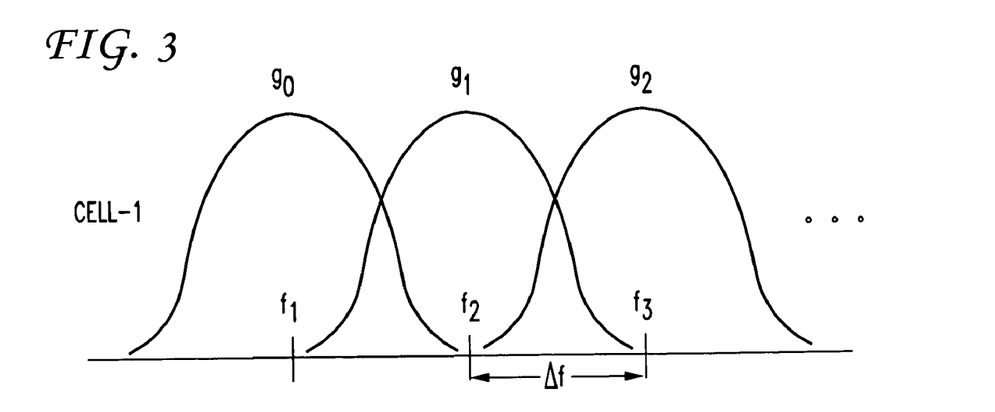
FIG. 3 depicts signal transmission in a cell using the frequency and code reuse pattern of FIG. 2.

Code division can be provided to WLAN systems as one additional feature for protecting against inter-cell interference according to the present invention. There are many different combinations of code division and frequency reuse that can be implemented which provide different balances between inter-cell interference protection and traffic capacity. To provide greater traffic capacity all (three) of the available, non-overlapping, ISM band frequencies can be provided in each cell as shown in the exemplary embodiment of FIGS. 2 and 3.

Therein, each cell is assigned all three frequencies ($f_1$, $f_2$, $f_3$) and three corresponding spreading (PN) codes which are unique as compared to adjacent cells. Thus, cell 30 and cell 32 are both allocated the same frequency set but have different sets of spreading codes, i.e., ($g_0$, $g_1$, $g_2$) and ($g_3$, $g_4$, $g_5$), respectively. Each frequency has a corresponding spreading code assigned thereto as shown, for example, in FIG. 3. Thus each wireless unit can be assigned to one of three different radio resources in any given cell. This provides maximum traffic capacity in each cell, albeit interference protection is limited to code division since all of the frequencies are reused in each adjacent cell.

Figure 4:
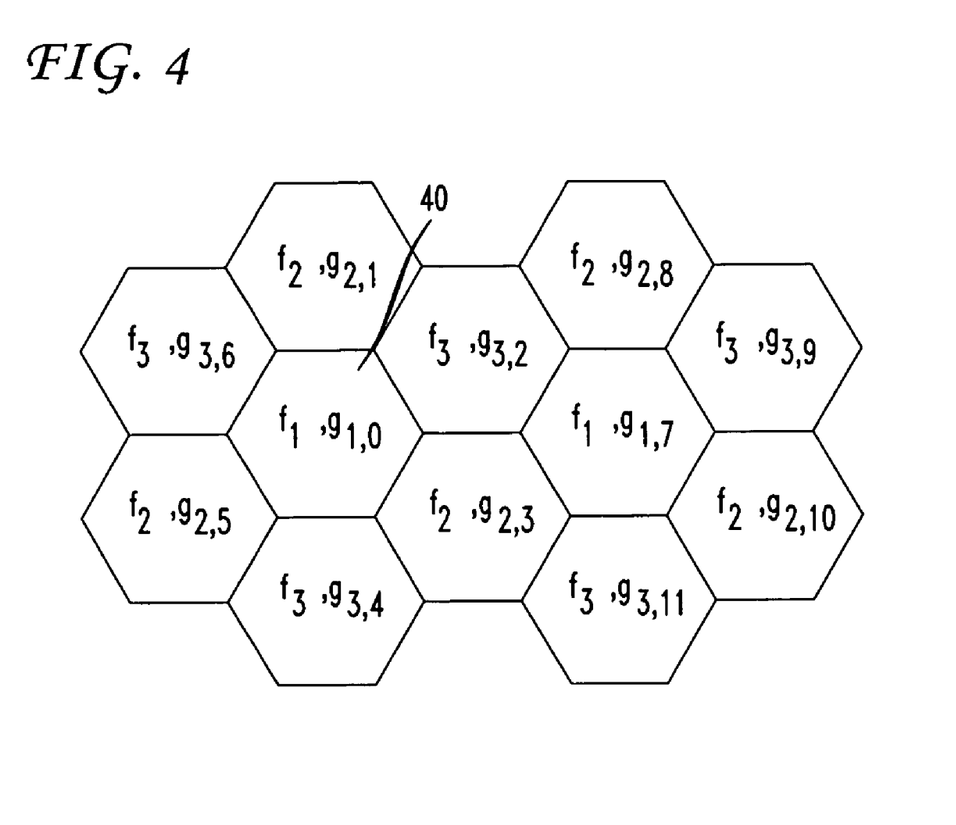
FIG. 4 shows a frequency and code reuse pattern according to another exemplary embodiment of the present invention.

Another exemplary frequency reuse/code division pattern is depicted in FIG. 4. Therein, only a single frequency and spreading code are allocated to each cell. This provides both frequency and code protection against inter-cell interferers, e.g., each of the cells adjacent to cell 40 are not permitted to use frequency $f_1$. This exemplary frequency reuse/code division pattern provides more protection against inter-cell interference, with the tradeoff being less traffic capacity per cell. In some cases, however, even separation in frequency and code may not be enough to sufficiently suppress inter-cell interference. For example, as described above in the Background Section, today's WLAN implementations typically employ three different frequencies spaced apart by a reuse distance, as well as one spreading code to suppress inter-cell interference. However, such a radio resource scheme may not provide sufficient interference mitigation to sustain reliable WLAN performance at data rates of 11 Mbps and higher.

To address this problem, Applicants have also provided, in addition to frequency reuse and code division, a time separation feature to WLAN systems, devices and methods according to the present invention. An exemplary implementation of radio resource management techniques employing this time separation feature will now be described with reference to the process diagram of FIG. 5. Therein, at block 500, an initial access point scan is performed by each access point in order to build a neighbor list. The determination of whether or not nearby access points should be added to the neighbor list associated with a particular access point can be made by scanning the beacon messages transmitted by each access point and quantifying their received signal strength. Those access points whose beacon messages are received, for example, with a sufficiently high signal strength can be classified as a neighbor and added to the neighbor list at step 502. Those skilled in the art will appreciate that various algorithms can be used to determine whether to add nearby access points to the neighbor list.

Once the neighbor list has been created, the flow moves into an idle state 504 from which various tasks can be performed. Each of these tasks can be performed periodically, e.g., after the expiration of a timer associated therewith, which timers can be based on the superframe structure used to service the wireless stations connected to WLANs according to the present invention. For example, each access point can periodically update its neighbor list by once again measuring the beacon messages transmitted by nearby access points at function 506. In this way, as new access points are added to the network, they can be automatically integrated into the radio resource management system of the present invention. Another function performed by each access point from the idle state 504 is the updating of its area of coverage. This function, referred to in FIG. 5 as updating the AP edge (function 508), gives each access point the capability to determine whether a given wireless station is disposed in a geographic region in which its coverage overlaps with that of another access point or if that wireless station is in a geographic region which it solely covers. The usefulness of this characterization is described in more detail below. To update its coverage area, an access point queries wireless stations that it is currently in communication with to make signal strength measurements on its signals, as well as those of neighboring access points, at step 510. The results of these measurements are reported to the access point at step 512 and used to update its coverage region at step 514.

Figure 5:
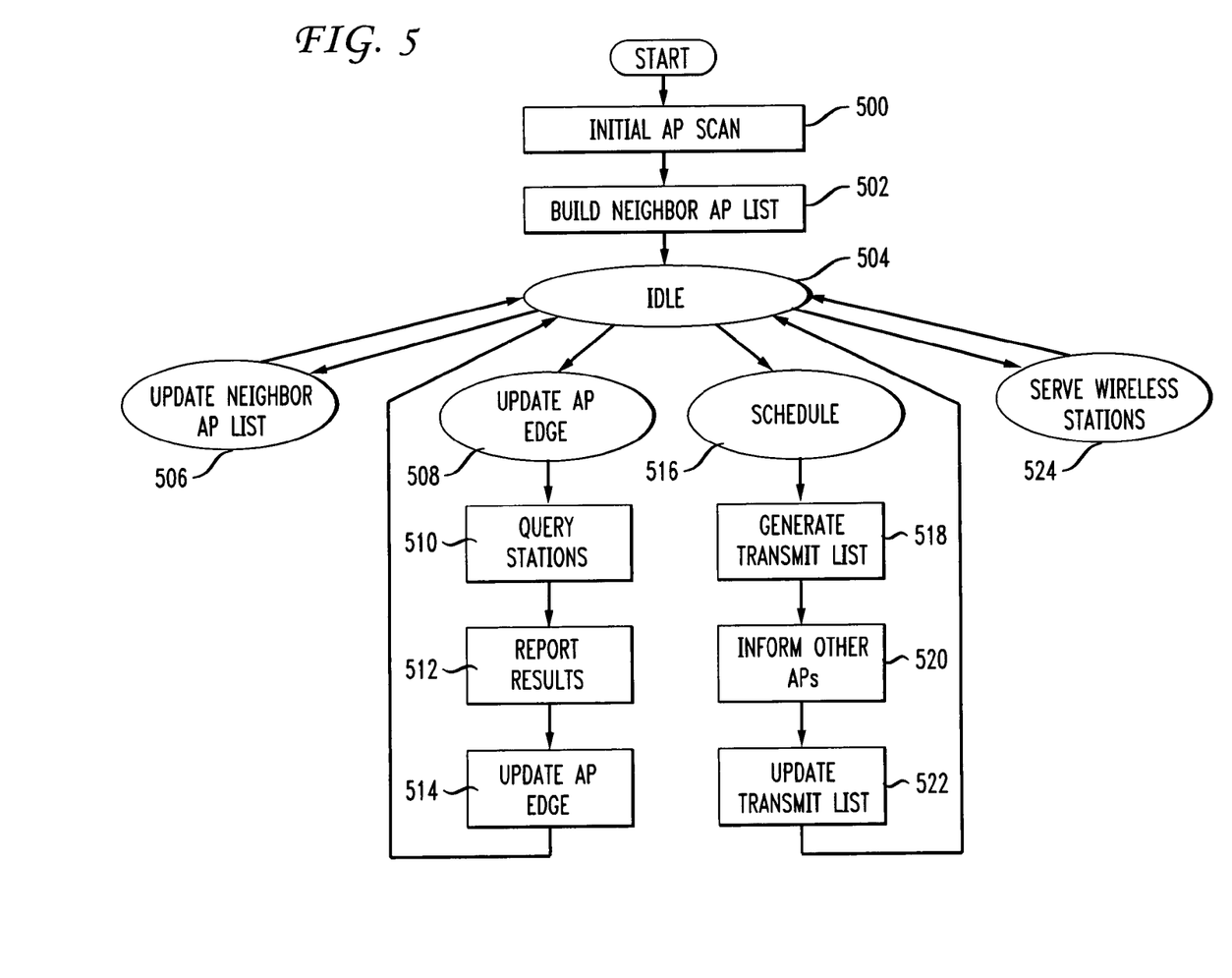
FIG. 5 illustrates radio resource management techniques according to exemplary embodiments of the present invention.

One of the functions used to establish the time separation feature of radio resource management according to exemplary embodiments of the present invention is the schedule function 516. This function is performed by access points in order to schedule transmissions in a manner which is intended to minimize overall system interference levels by coordinating transmissions in overlapping areas. Initially, the access point will generate its own transmit list (step 518) which includes determining the amount of time it needs to service transmissions to its wireless stations during this period (superframe). Each data stream associated with a particular wireless station in an area of overlapping coverage will have a corresponding requested transmission time, the sum of which represents the access point's total time to transmit in an area whose coverage overlaps with an adjacent access point. This time allocation requirement can then be communicated to adjacent access points at step 520. The time allocation requirement can be communicated to adjacent access points either, for example, via the backbone wired network or broadcast over the wireless media. Each access point, as it receives time allocation requirements from its neighbors, marks those time periods as "no transmit" times for itself and updates its own transmit list accordingly at step 522.

After scheduling, an access point is ready to serve the wireless stations within its coverage area (function 524). This function is shown in more detail in FIG. 6. Therein, at step 600, an access point first determines whether the current time is one during which it is scheduled to serve its own transmit time or not by checking its transmit list. If the access point is not permitted to transmit at this time, then the flow proceeds to step 602 where the access point determines whether the contention free period (CFP) has expired or not. The CFP timer delineates the time during which access points using the radio resource management techniques described herein are either serving the wireless stations in their coverage area or are in an enforced period of transmitter silence. As will be explained below, exemplary embodiments of the present invention may also include contention periods (CP) during which legacy equipment using, e.g., CSMA access methodologies, can communicate with the system. If the CFP timer has expired at step 602, then the access point awaits the next cycle and returns to the idle state 504. Otherwise, the flow proceeds to block 604 where the access point waits for its period of forced transmitter silence to end.

Figure 6:
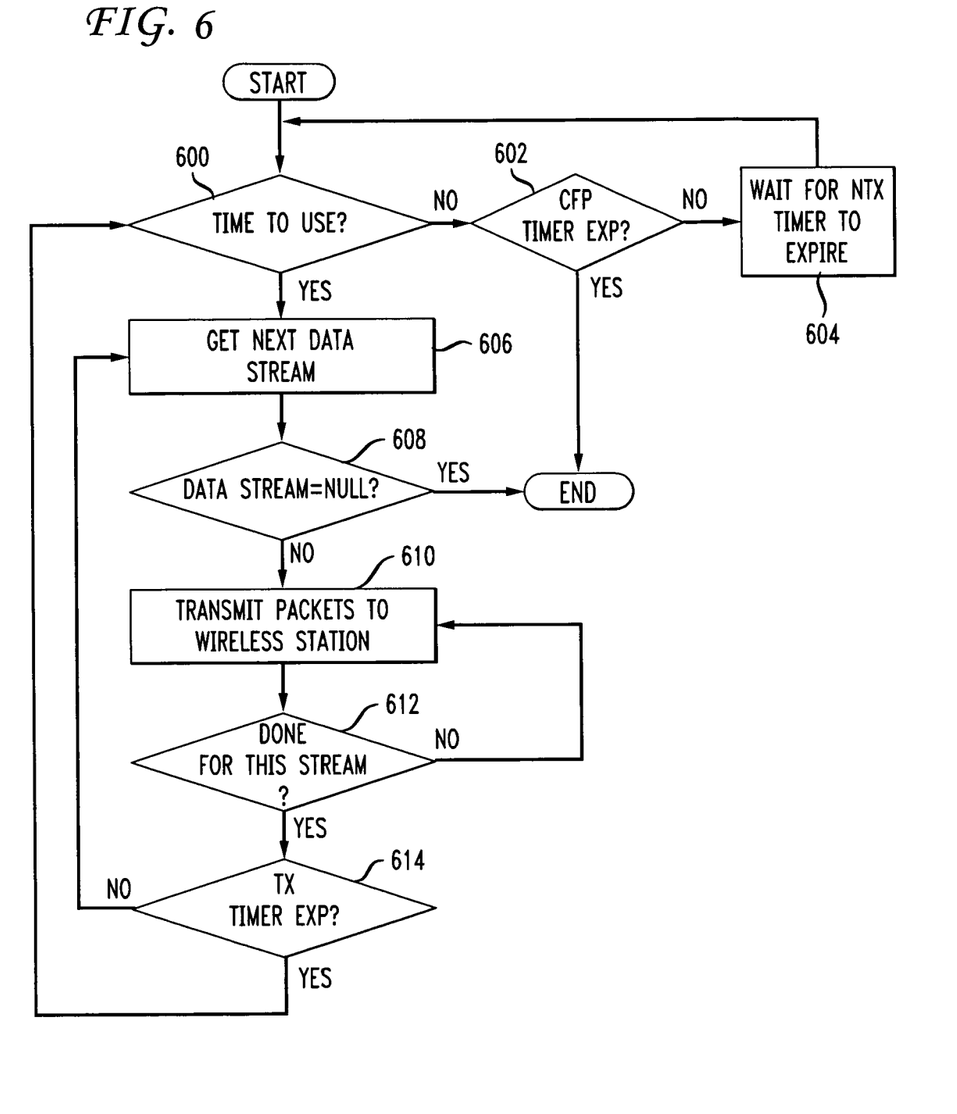
FIG. 6 is a flowchart depicting a service function of the radio resource management techniques of FIG. 5 in more detail.

If, on the other hand, the time to use check at step 600 is affirmative, the flow follows the YES branch to step 606 where the next data stream is processed for transmission by the access point. In this exemplary embodiment of the present invention, the last data stream in an access point's transmission list is characterized by a NULL value (step 608) which terminates the serving function and returns the access point to its idle state 504. Those skilled in the art will appreciate that any of a number of different techniques can be used to identify the end of the transmission list. If this is not the last data stream, the access point will then begin to transmit data packets to the next wireless station in its transmission list at step 610 and continue sending packets until a predetermined condition occurs, e.g., the access point has no more packets to send to this particular wireless station. Alternatively, the condition which terminates transmission to this particular wireless station at step 612 can be the expiration of a data stream transmit timer or reaching a throughput limit. In any case, the flow will eventually exit this loop and proceed to step 614 whereupon the access point will check to see if it still has time remaining in its transmit window to serve another wireless station. If so, the access point will retrieve the next data stream for transmission (step 606). If not, then the flow returns to block 600 to await the next transmit opportunity.

Having described exemplary radio resource management techniques for communicating in WLAN systems according to the present invention, an exemplary time separation frame structure which can be used to implement these techniques will now be described with reference to FIGS. 1 and 7. Returning again to FIG. 1, it can be seen that some of the wireless stations, e.g., stations 52 and 54, are disposed in areas of overlapping coverage. That is, wireless station 52 is within the coverage area of both AP1 and AP2, while wireless station 54 is within the coverage area of both AP2 and AP3. The other wireless stations 56-62 are in areas of non-overlapping coverage. The time resource can then be divided into (1) a first time window in which transmission occurs from the access point to wireless stations in an overlap area, (2) a second time window during which the access point is not permitted to transmit and (3) a third time window in which transmission occurs to wireless stations that are not in an overlap area associated with that access point. The set of windows define how transmission resources are divided for a particular access point for a particular superframe. The window values can change from superframe to superframe as described above depending upon each access point's need for transmit resources during any given superframe.

Figure 7:
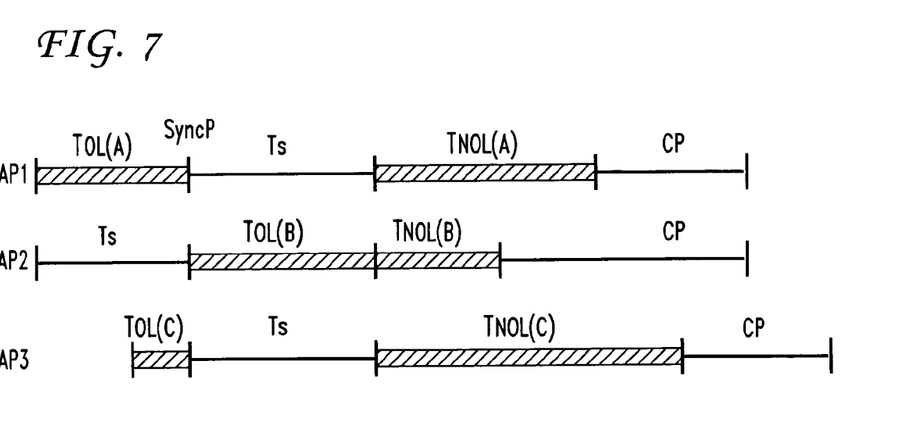
FIG. 7 depicts a time resource allocation between three overlapping cells in a WLAN system according to an exemplary embodiment of the present invention.

FIG. 7 depicts an example of a resulting frame structure which can occur when employing radio resource management features according to the present invention. Therein, the notation $T_{OL(X)}$ refers to a time period during which access point X is transmitting to wireless stations disposed in an area which overlaps with another access point. The notation $T_S$ refers to a forced silence period employed to prevent interference with TOL traffic from overlapping access points. The notation $T_{NOL(X)}$ refers to a time period during which access point X transmits to wireless stations that are not disposed in areas which overlap with other access points. The notation CP refers to a contention period which can be provided to support legacy WLAN equipment, e.g., equipment which uses carrier sense multiple access-collision avoidance (CSMA-CA) techniques to access the WLAN system.

In the context of the example provided with respect to FIGS. 1 and 7, access point 1 will, for example, transmit to wireless station 52 during the time period TOGA) and to wireless stations 56 and 57 during the time period $T_{NOL(A)}$. Likewise, access point 3 will transmit to wireless station 54 during time period $T_{OL(C)}$ and to wireless stations 58 and 59 during time period $T_{NOL(c)}$. During the period $T_S$ when access point 1 and 3 are silent, access point 2 can then transmit to any wireless stations that are within the overlap areas with access points 1 and 3 (none shown in FIG. 1). Access point 2 is silent while access points 1 and 3 are transmitting to wireless stations 52 and 54 and can transmit to wireless stations 60 and 61 during $T_{NOL(B)}$, i.e., during the same time that access points 1 and 3 transmit to wireless stations 56, 57, 58 and 59.

As mentioned above, in order to adapt the window values to changing traffic conditions, each access point maintains certain information regarding traffic in its own cell. This information can be determined based upon overlap management information received from wireless stations connected thereto. For example, each access point can maintain a table of its associated wireless stations and group them into two categories (i.e., those within an overlapping area and those outside of an overlapping area). At the start of its beacon cycle, each access point can calculate and allocate the total overlap time by summing up all overlapping stations' request time and the time offset to the start of next beacon interval and duration.

According to exemplary embodiments of the present invention, the information maintained by each access point includes: (1) the amount of superframe time that the access point needs to allocate to non-overlapping traffic in its cell, (2) the total amount of superframe time that the access point needs to allocate for overlapping traffic in its cell and (3) a more specific list breaking down the total amount of time allocated to overlapping traffic on a per access point basis. This last information element can, for example, be maintained as a list of overlapping time between two access points and access point ID ($T_{OL(X, Y)}$, Access Point ID). This timing information is broadcast for other access points to receive in a beacon signal. In addition to its own timing information, each access point can include the information received from other access points in its beacon signal broadcast. This permits the system to optimize TOL time allocation using the broadcast information of the relative overlap conditions between access points in a particular area, so that the window values described above can be set appropriately. Taking the example provided above with respect to FIGS. 1 and 7, the beacon for access point 1 will, therefore, include its own information [$T_{NOL(1)}$, $T_{OL(1,2)}$, $T_{OL(1)}$] and information associated with its neighboring access point 2 [$T_{NOL(2)}$, $T_{TOL(2)}$]. Similarly, the beacon for access point 3 will include [$T_{NOL(3)}$, $r_{OL(3,2)}$, $T_{TOL(3)}$] and [$T_{NOL(2)}$, $T_{OL(2)}$]. The beacon for access point 2 will include its own information [$T_{NOL(2)}$, $T_{OL(2,1)}$, $T_{OL(2,3)}$, $T_{TOL(3)}$] and information received from access points 1 and 2 via their beacon signals. [$T_{NOL(1)}$, $T_{TOL(1)}$, $T_{NOL(3)}$, $T_{TOL(3)}$].

Figure 8:
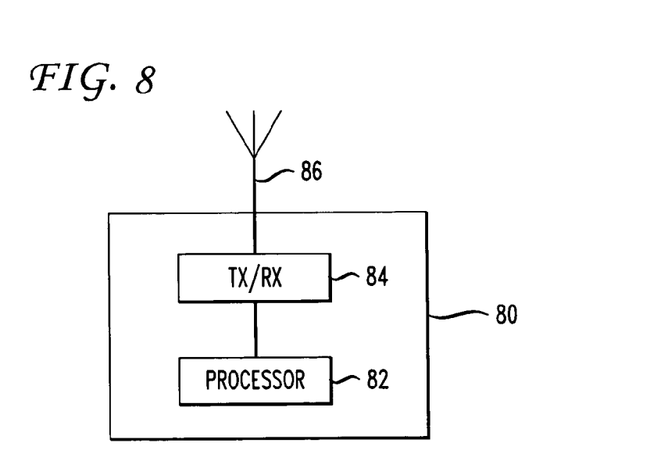
FIG. 8 shows an exemplary wireless station which can be employed in exemplary embodiments of the present invention.

Using the aforedescribed code division, frequency reuse and time overlap management techniques, Applicants have found that intercell interference in WLAN systems can be reduced to an acceptable level even when WLAN cells have significant overlap. The devices, e.g., access points and wireless stations, used to implement the present invention can be substantially similar to conventional WLAN devices. As shown generally in FIG. 8, each device 80 will have a processor 82, transceiver 84 and antenna 86. The transceiver 84 will include spreading and dispreading units in order to handle the aforedescribed code division feature of the present invention. If the beacon signals are implemented outside of the traditional WLAN bandwidth, then the transceiver 84 shall be able to tune to and detect information signals at the frequency of the beacon as well as information signals in the WLAN bandwidth.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method executed in an Access Point (AP) device for wireless communication comprising the steps of:
   assigning a communication channel to a wireless station by specifying to said wireless station a carrier frequency and a code-division-multiplexing code;
   determining whether said wireless station is located in a first area of a first cell which overlaps with another cell or in a second area of said first cell which is non-overlapping with respect to said another cell;
   with time divided into superframes, each of which comprising a first portion, a second portion, a third portion and a fourth portion, with the portions being disjoints, allowing transmission to said wireless station during said first portion of a superframe of said superframes if said wireless station is located in an area that is reachable by a neighboring AP device, refraining from transmitting during said second portion of said superframe, allowing transmission to said wireless station during said third portion if said wireless station is located in an area that is not reachable by said neighboring device, and allowing transmissions during said fourth portion by stations that employ a contention protocol.

* * * * *